UNITED STATES PATENT OFFICE.

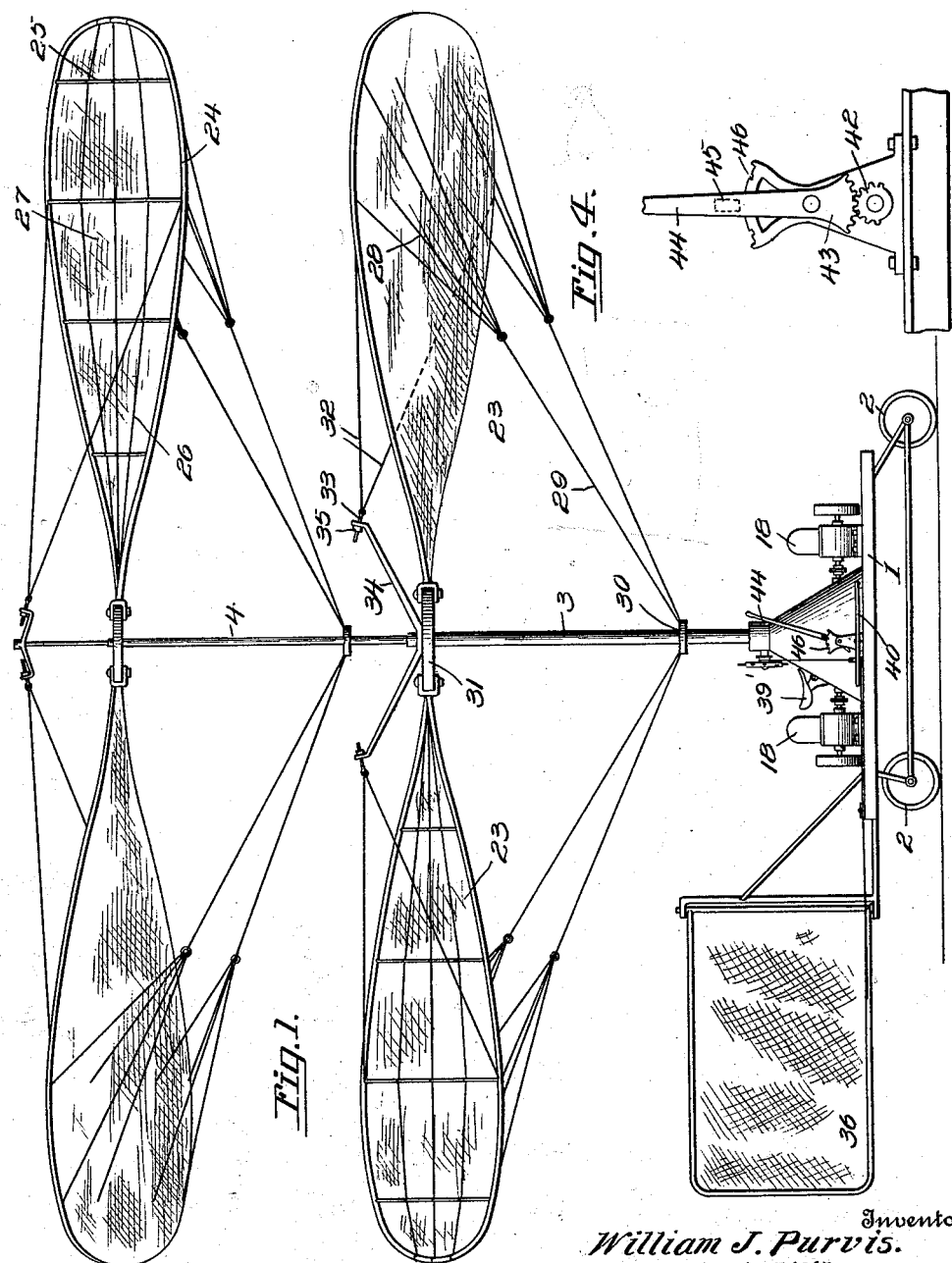

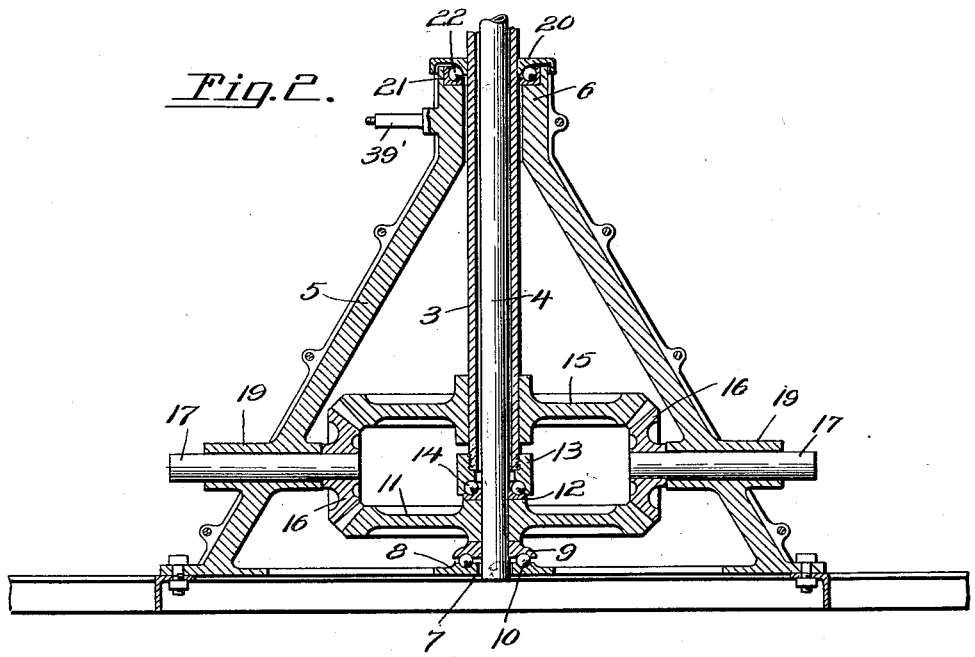
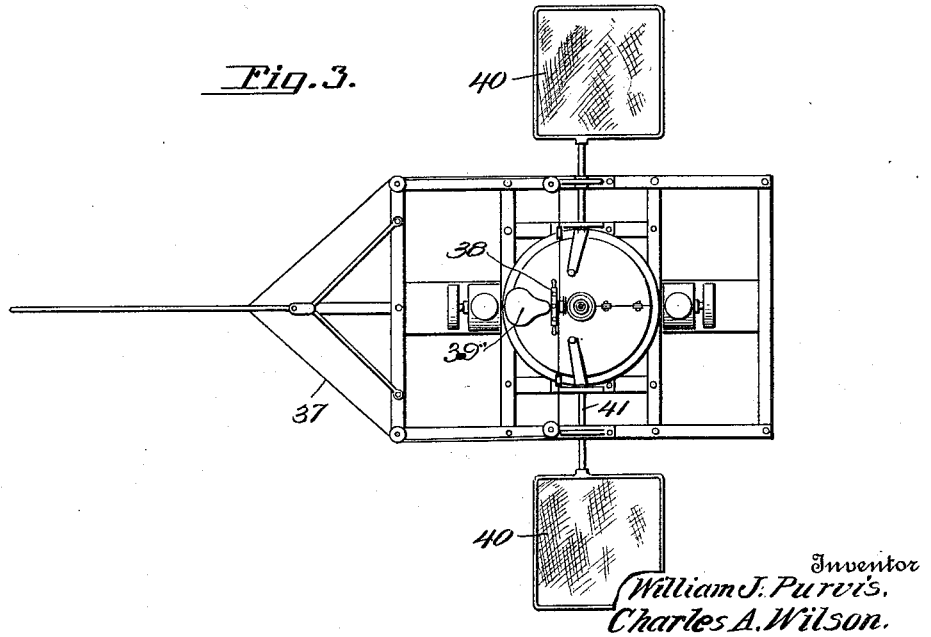

WILLIAM J. PURVIS AND CHARLES A. WILSON, OF GOODLAND, KANSAS.

FLYING-MACHINE.

1,028,781.  Specification of Letters Patent.  Patented June 4, 1912.

Application filed March 18, 1910, Serial No. 550,264.   Renewed November 2, 1911.   Serial No. 658,236.

*To all whom it may concern:*

Be it known that we, WILLIAM J. PURVIS and CHARLES A. WILSON, citizens of the United States, residing at Goodland, in the county of Sherman and State of Kansas, have invented new and useful Improvements in Flying-Machines, of which the following is a specification.

This invention relates to flying machines of the helicoptre type, the object of the invention being to provide a machine of this character having a novel construction and arrangement of propellers and balancing and tilting planes whereby the machine may be driven upwardly or forwardly at will, supported in a stationary position in the air and controlled in its descent so that safe landings may be made.

A further object of the invention is to provide a novel construction and arrangement and mode of mounting and bracing the propeller shafts, whereby ease of operation and strength and durability are secured.

The invention consists of the features of construction, combination and arrangement of devices, hereinafter more fully described and claimed, reference being had to the accompanying drawings, in which:—

Figure 1 is a side elevation of a flying machine embodying our invention. Fig. 2 is an enlarged vertical longitudinal section through the bearings for the propeller shafts. Fig. 3 is a top plan view of the machine, omitting the propellers. Fig. 4 is a detail view of the means for controlling each tilting plane.

Referring to the drawings, 1 designates the car or frame of the machine, provided with ground wheels or rollers 2. Rising from said frame are normally vertical shafts 3 and 4, the shaft 3 inclosing the lower end of the shaft 4, as shown. The shafts extend at their lower ends into a substantially conical casing 5 securely fixed to the frame and terminating at its upper reduced end in a substantially cylindrical collar 6.

The lower extremity of the inner shaft 4 is stepped in an opening 7 formed in a bearing member 8 mounted on the frame, and has fixed thereto above said bearing member a coöperating bearing member 9, the meeting faces of said members being grooved to form a raceway for bearing balls 10. Fixed to the shaft 4 above the member 9 is a beveled gear 11, the upper face of the hub of which has fixed thereto a bearing plate or member 12. The lower end of the outer or tubular shaft 3 carries a bearing member or collar 13 arranged immediately above the member 12, the meeting faces of said members being grooved to form a raceway for bearing balls 14. By this construction, it will be seen that the lower end of the shaft 4 is journaled to rotate on anti-friction bearings carried by the frame, while the lower end of the shaft 3 is journaled to rotate upon similar bearings carried by the shaft 4, whereby said shafts are stably supported for free rotation in opposite directions.

The lower end of the shaft 3 also carries a beveled gear 15, and the teeth of the gears 11 and 15 are arranged to mesh with the teeth of interposed oppositely arranged beveled driving pinions 16 mounted upon the shafts 17 of oppositely arranged motors 18, said shafts entering the casing 5 and being journaled in suitable bearings 19 formed thereon. The motor shafts and their pinions rotate in opposite directions and consequently rotate the gears 11 and 12 in reverse directions to impart corresponding motion to the shafts 3 and 4. The shafts extend upwardly through the collar 6 and the shaft 3 has fixed thereto a flanged bearing plate or collar 20 inclosing the upper extremity of the collar and disposed above a bearing plate 21 mounted on the collar, the opposing faces of said plates being grooved to form raceways for anti-friction bearing balls 22, by which the shafts are supported at a suitable elevation above the frame to prevent lateral deflection thereof. It is contemplated in practice to provide means whereby the speed of revolution of the shafts 3 and 4 may be controlled without reducing the speed of the motors, which gearing may be of the type commonly employed on automobiles, but the speed of the motors may be controlled for the purpose set forth, if desired.

The shaft 4 extends upwardly beyond the shaft 3, and each of said shafts carries at its upper end a pair of diametrically disposed, horizontally arranged propellers 23, the propellers of each shaft and their mode of mounting being the same, so that a description of one will suffice for both. Each propeller blade comprises a substantially elliptical frame 24 the sides of which are connected and braced by cross pieces 25, to which frame and cross pieces are also attached longitudinal bracing wires 26, and over which frame is stretched a covering 27 of fabric or other suitable material. The blades are transversely curved or of concavo-convex form in cross section and so pitched that when the machine is in a substantially horizontal position and the shafts vertically arranged they will produce a down thrust to elevate the machine, while when the machine is tilted at a downward and forward angle to a certain degree the blades will produce a combined down and rear thrust to sustain and propel the machine forwardly.

The convex side of each blade has attached thereto groups of stay wires 28 which are connected by guy wires 29 with a collar 30 on the shaft below a supporting collar 31 to which the inner ends of the blades are fastened, while the concaved portion of each blade has extending therefrom converging guy wires 32 connected with eye bolts 33 passing through the angularly bent ends of stay arms 34 extending from the shaft above the collar 31, said bolts being fitted with adjusting and retaining nuts 35.

It will be observed that the two sets of propeller blades are so mounted upon their shafts and arranged with respect to each other as to permit of the described disposition of the guys or bracing connections without liability of their interference in the rotation of the propellers.

The machine is designed to be steered laterally by a rear, pivoted vertical rudder 36 to which are connected opposite controlling cords or wires 37 passing around suitable guide pulleys to a suitable tiller or steering wheel 38 journaled on a stud bolt 39 projecting from the rear of the collar 6, said tiller being arranged to be conveniently operated by the aeronaut whose seat 39' is mounted upon the casing below and in rear of the tiller. In practice, the casing is preferably of sectional construction, as shown, so that it may be taken apart for access to the gearing. It will be understood, of course, that in starting a flight the propellers will be set in motion at the required speed to elevate the machine to the desired height above the surface of the ground, and that when it is desired to descend the speed of the propellers is reduced to a point slightly below sustentation speed, whereupon the machine will descend easily to the ground surface.

In order to enable the machine to be tilted for forward propulsion, vertically swinging or tilting planes 40 are provided at the opposite sides of the machine and extending outwardly therefrom. Each of these planes is mounted upon a transverse rock shaft 41 carrying at its inner end a gear segment 42 with which meshes a toothed rack or segment 43 on the lower end of an operating lever 44, said lever having a suitable dog or latch 45 to engage a rack 46, whereby it may be secured in a variety of adjusted positions, the construction and arrangement thus being such that the aeronaut may simultaneously adjust the planes to different angular positions in the same or opposite directions, at will.

In elevating the machine above the surface of the ground, the planes are adjusted to a vertical position to eliminate their resistance to upward flight. When the proper elevation is reached and it is desired to propel the machine forwardly, the planes are tilted to lie at a downward and forward inclination, so that the pressure of the air thereon will tilt the machine forwardly to a certain degree, whereupon the propellers will operate to force the machine forwardly and also tend to force it upwardly to the desired degree to maintain the equilibrium of the machine. In making a turn in either direction, the rudder 36 is properly adjusted and the plane on the short turning side tilted downward to a slightly greater degree to list and bank the machine to the necessary extent to prevent excessive skidding.

Having thus described the invention, we claim:—

1. A flying machine comprising a frame, vertical shafts carried by the frame, a casing in which said shafts are journaled, means for rotating said shafts, lifting and sustaining propellers carried by the shafts, horizontal shafts extending laterally from the opposite sides of the machine, tilting planes eccentrically mounted on said horizontal shafts at right angles to the line of flight for movement in a vertical plane, an operator's seat arranged in rear of the casing, gears carried by the horizontal shafts, brackets upon the frame on opposite sides of the casing and carrying fixed racks, levers fulcrumed on said brackets and carrying segments meshing with the gears on the horizontal shafts, and pawls carried by said levers to engage the racks and lock the levers in adjusted position.

2. A flying machine comprising a frame, a casing mounted thereon, shafts coaxially mounted and extending at their lower ends into said casing, one of said shafts projecting above the other, upper and lower collars mounted on each shaft, inclined arms upon each shaft above the upper collar, said arms having upwardly bent perforated ends, propeller blades carried by each shaft and secured to the upper collars thereof, guys extending from the under side of the blades to the lower collar, guys extending to the upper surfaces of the blades, eye bolts connected with the latter-named guys and passing through the bent ends of the angularly arranged arms, and nuts fitted on said bolts and bearing against the bent ends of the arms.

3. A flying machine comprising a frame, a substantially conical gear casing mounted on the frame and having a cylindrical bearing collar at its upper reduced end, a vertical propeller shaft journaled at its lower end in the base of the casing, bearing members on the base of the casing and lower end of the shaft, bearing balls between said bearing members, a beveled gear wheel carried by said propeller shaft, above said bearing members, a hollow vertical propeller shaft extending into the casing and inclosing the first-named propeller shaft, anti-friction bearings between the lower end of the hollow shaft and the beveled gear, anti-friction bearings between the hollow shaft and cylindrical collar, a second bevel gear mounted upon said hollow shaft, pinions meshing with the beveled surfaces of said gears, horizontal drive shafts journaled in the casing and carrying said pinions, motors for driving said horizontal shafts, and propellers carried by the said vertical propeller shafts.

In testimony whereof we affix our signatures in presence of two witnesses.

WILLIAM J. PURVIS.
CHAS. A. WILSON.

Witnesses:
F. H. SMITH,
JOHN HARTZLER.

Copies of this patent may be obtained for five cents each, by addressing the "Commissioner of Patents, Washington, D. C."